United States Patent
Shimogaki et al.

(10) Patent No.: US 11,545,869 B2
(45) Date of Patent: Jan. 3, 2023

(54) MOTOR HAVING FRAME WITH AXIAL VENT HOLE

(71) Applicant: EXEDY Corporation, Neyagawa (JP)

(72) Inventors: Yoshifumi Shimogaki, Neyagawa (JP); Takashi Imoto, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 94 days.

(21) Appl. No.: 17/201,224

(22) Filed: Mar. 15, 2021

(65) Prior Publication Data
US 2021/0320550 A1 Oct. 14, 2021

(30) Foreign Application Priority Data
Apr. 14, 2020 (JP) .............................. JP2020-072340

(51) Int. Cl.
*H02K 5/173* (2006.01)
*H02K 5/20* (2006.01)
*H02K 9/02* (2006.01)

(52) U.S. Cl.
CPC ............. *H02K 5/1732* (2013.01); *H02K 5/20* (2013.01); *H02K 9/02* (2013.01)

(58) Field of Classification Search
CPC ...... H02K 1/187; H02K 21/22; H02K 5/1732; H02K 5/1735; H02K 5/20; H02K 9/02; H02K 9/06
See application file for complete search history.

(56) References Cited

U.S. PATENT DOCUMENTS

| 10,655,685 B2* | 5/2020 | Imanishi | F16D 13/54 |
| 2019/0181701 A1* | 6/2019 | Park | H02K 3/18 |
| 2019/0241259 A1* | 8/2019 | Tsutsumi | H02K 1/27 |

OTHER PUBLICATIONS

David,, Brushless DC motor with bearings; AU-2007309509; date: Jun. 2009; Australia; All pages (Year: 2009).*

* cited by examiner

*Primary Examiner* — Naishadh N Desai
(74) *Attorney, Agent, or Firm* — United IP Counselors, LLC

(57) ABSTRACT

A motor includes a support frame, a stator, a bearing member, and a rotor. The support frame includes first and second tubular parts, and a vent hole. The second tubular part is disposed radially outside the first tubular part. The vent hole, extending axially, is provided between the first and second tubular parts. The stator is disposed radially outside the second tubular part, and supported by the second tubular part. The bearing member is disposed inside and supported by the first tubular part. The rotor includes a rotor frame, a shaft, and a permanent magnet. The rotor frame is disposed on a first side with respect to the support frame in the axial direction. The shaft is fixed to the rotor frame. The shaft is attached rotatably to the support frame through the bearing member. The permanent magnet is disposed radially outside the stator, and supported by the rotor frame.

10 Claims, 5 Drawing Sheets

MOTOR HAVING FRAME WITH AXIAL VENT HOLE

CROSS-REFERENCE TO RELATED APPLICATIONS

This application claims priority to Japanese Patent Application No. 2020-072340, filed Apr. 14, 2020. The entire contents of that application are incorporated by reference herein in their entirety.

TECHNICAL FIELD

The present invention relates to a motor.

BACKGROUND ART

Drones have begun to prevail in recent years. In general, a drone includes a body, a plurality of frames radially extending from the body, and a plurality of motors attached to the distal ends of the frames, respectively. The motors rotate propellers, respectively. This type of drone motor includes a housing that supports a bearing member and a coil part (see Specification of United States Patent Application Publication No. US 2019/0181701).

In such a drone motor configured as described above, the coil part generates heat. Then, the heat is transferred from the coil part to the bearing member through the housing. This results in a drawback that the bearing member is deteriorated.

BRIEF SUMMARY

It is an object of the present invention to inhibit deterioration of a bearing member.

A motor according to an aspect of the present invention includes a support frame, a stator, a bearing member, and a rotor. The support frame includes a first tubular part, a second tubular part, and a vent hole. The second tubular part is disposed radially outside the first tubular part. The vent hole is provided between the first and second tubular parts so as to extend in an axial direction. The stator is disposed radially outside the second tubular part. The stator is supported by the second tubular part. The bearing member is disposed inside and supported by the first tubular part. The rotor includes a rotor frame, a shaft, and a permanent magnet. The rotor frame is disposed on a first side with respect to the support frame in the axial direction. The shaft is fixed to the rotor frame. The shaft is attached in a rotatable manner to the support frame through the bearing member. The permanent magnet is disposed radially outside the stator. The permanent magnet is supported by the rotor frame.

According to this configuration, the stator is supported by the second tubular part. Hence, heat is transferred from the stator to the second tubular part. The vent hole is provided between the second tubular part and the first tubular part. Hence, heat is inhibited from being transferred from the second tubular part to the first tubular part. As a result, heat is inhibited from being transferred to the bearing member supported by the first tubular part as well. Hence, deterioration of the bearing member can be inhibited.

It should be noted that the air, supplied to the interior of the motor by rotation of a propeller, flows into the vent hole, whereby the first and second tubular parts are cooled. As a result, heat can be further inhibited from being transferred from the second tubular part to the first tubular part, whereby heat can be further inhibited from being transferred to the bearing member as well.

Preferably, the first tubular part includes a protruding portion protruding further than the second tubular part to the first side in the axial direction. With the protruding portion, the air can be led to the vent hole.

Preferably, the first tubular part includes a body. The protruding portion protrudes from the body to the first side in the axial direction. The protruding portion is less in outer diameter than the body.

Preferably, the bearing member is supported inside the protruding portion.

Preferably, the rotor frame includes a plurality of through holes arranged in a circumferential direction. The plurality of through holes are disposed radially outside the vent hole.

Preferably, the rotor frame includes a slant portion. The slant portion extends radially outward to approach a second side in the axial direction. The plurality of through holes are provided in the slant portion. According to this configuration, the air, entering the motor through the plurality of through holes, can be supplied to the vent hole.

Preferably, the vent hole has a cross-sectional area gradually increasing to the first side in the axial direction at an end thereof disposed on the first side in the axial direction.

Preferably, the rotor includes a boss part protruding from the rotor frame to the first side in the axial direction. The boss part is configured to enable a propeller to be attached thereto.

Preferably, the stator includes a stator core and a coil part wound about the stator core.

Preferably, the coil part further extends than the second tubular part to the first side in the axial direction.

Overall, according to the present invention, deterioration of a bearing member can be inhibited.

DETAILED DESCRIPTION

Figure 1:
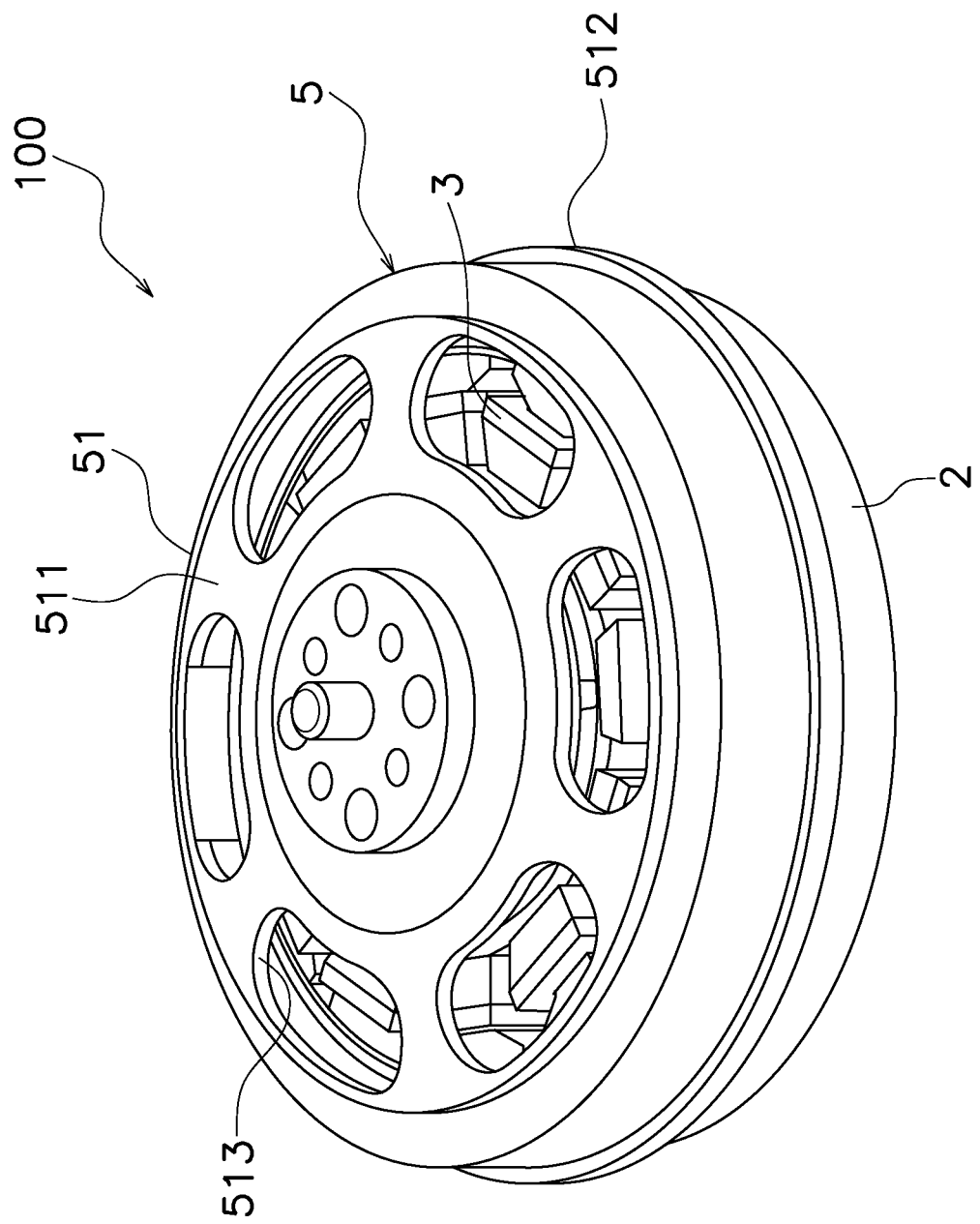
FIG. 1 is a perspective view of a motor.
Figure 2:
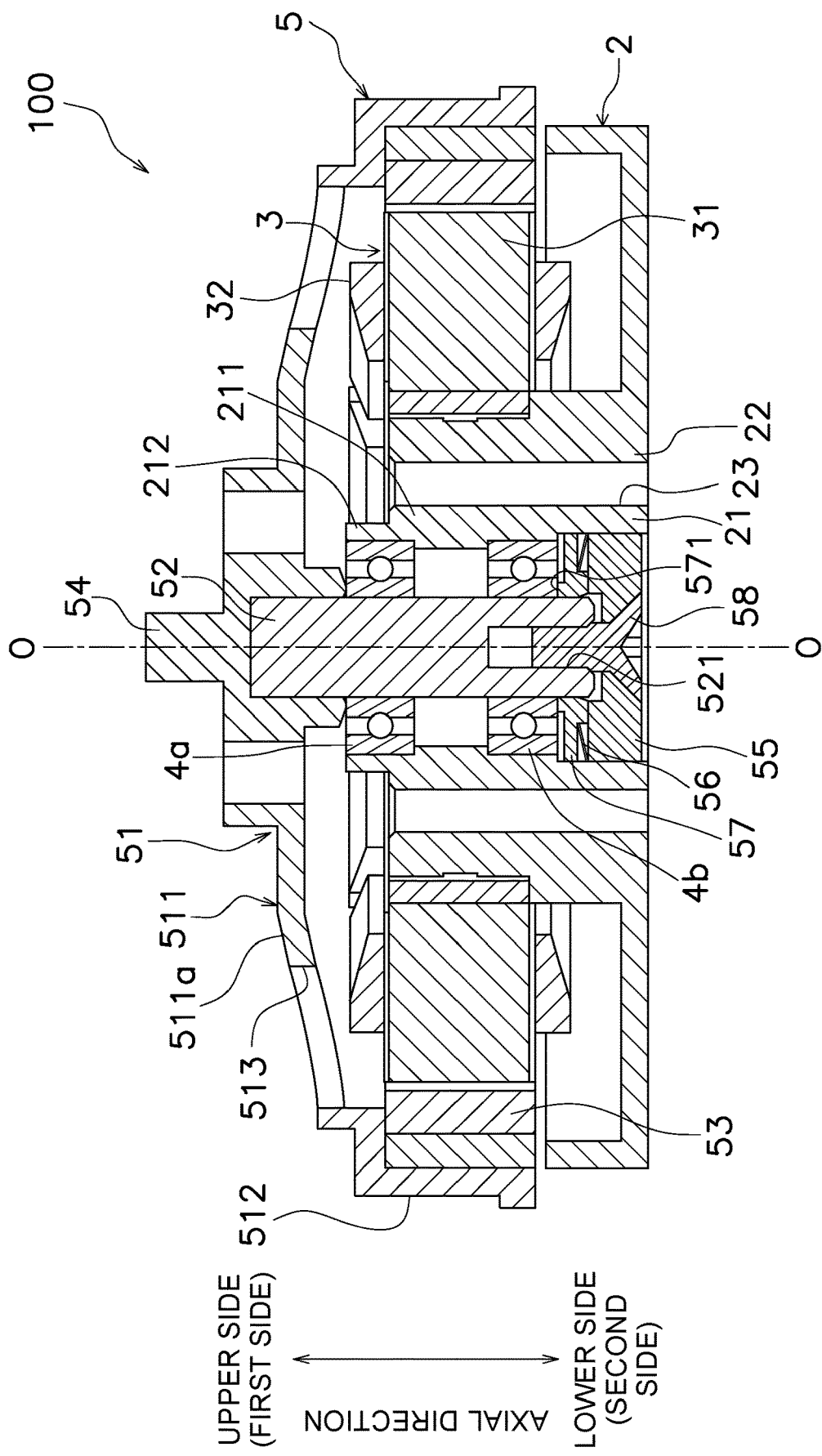
FIG. 2 is a cross-sectional view of the motor.

A motor according to a preferred embodiment will be hereinafter explained with reference to drawings. FIG. 1 is a perspective view of the motor, whereas FIG. 2 is a cross-sectional view of the motor. It should be noted that in the following explanation, the term "axial direction" means an extending direction of a rotational axis of the motor. The term "first side in the axial direction" means the upper side in FIG. 2, whereas the term "second side in the axial direction" means the lower side in FIG. 2. Moreover, the term "circumferential direction" means a circumferential direction of an imaginary circle about the rotational axis. The term "radial direction" means a radial direction of the imaginary circle about the rotational axis.

[Entire Configuration]

As shown in FIGS. 1 and 2, a motor 100 includes a support frame 2, a stator 3, a plurality of bearing members 4a and 4b, and a rotor 5. The motor 100 is configured to rotate a propeller of a drone. A rotational axis O of the motor 100 extends in an up-and-down direction. In other words, in the present preferred embodiment, the axial direction means the up-and-down direction. The motor 100 is a drone motor. The motor 100, when described in detail, is used for an industrial drone.

The propeller (not shown in the drawings) of the drone is disposed on the upper side (exemplary first side in the axial direction) of the motor 100. The drone includes a plurality of motors of the same type as the motor 100. In general, the drone includes four motors 100. The motors 100 are attached to a body part of the drone through arms and so forth, respectively. The body part of the drone accommodates a battery, a control unit, and so forth.

[Support Frame]

The support frame 2 includes a first tubular part 21, a second tubular part 22, and a plurality of vent holes 23. The support frame 2 is made of material such as metal. When described in detail, aluminum alloy, magnesium alloy, or so forth can be employed as the material of the support frame 2.

The first tubular part 21 is made in the shape of a cylinder extending in the axial direction. The first tubular part 21 includes a body 211 and a protruding portion 212. Each of the body 211 and the protruding portion 212 is made in the shape of a cylinder extending in the axial direction. The body 211 includes a plurality of stepped portions on the inner peripheral surface thereof. The stepped portions restrict the bearing members 4a and 4b from moving in the axial direction.

The protruding portion 212 protrudes from the body 211 to the upper side. The protruding portion 212 further protrudes than the second tubular part 22 to the upper side. In other words, the upper end of the protruding portion 212 is located on the upper side in comparison with that of the second part 22. With the protruding portion 212 thus formed, the air flowing radially inward can be led to the vent holes 23.

The protruding portion 212 is less in outer diameter than the body 211. The protruding portion 212 is substantially equal in inner diameter to the body 211.

The second tubular part 22 is made in the shape of a cylinder extending in the axial direction. The second tubular part 22 is disposed radially outside the first tubular part 21. In other words, the first tubular part 21 is disposed inside the second tubular part 22. The first and second tubular parts 21 and 22 are disposed radially apart from each other at an interval. In other words, the outer peripheral surface of the first tubular part 21 is not in contact with the inner peripheral surface of the second tubular part 22.

Figure 3:
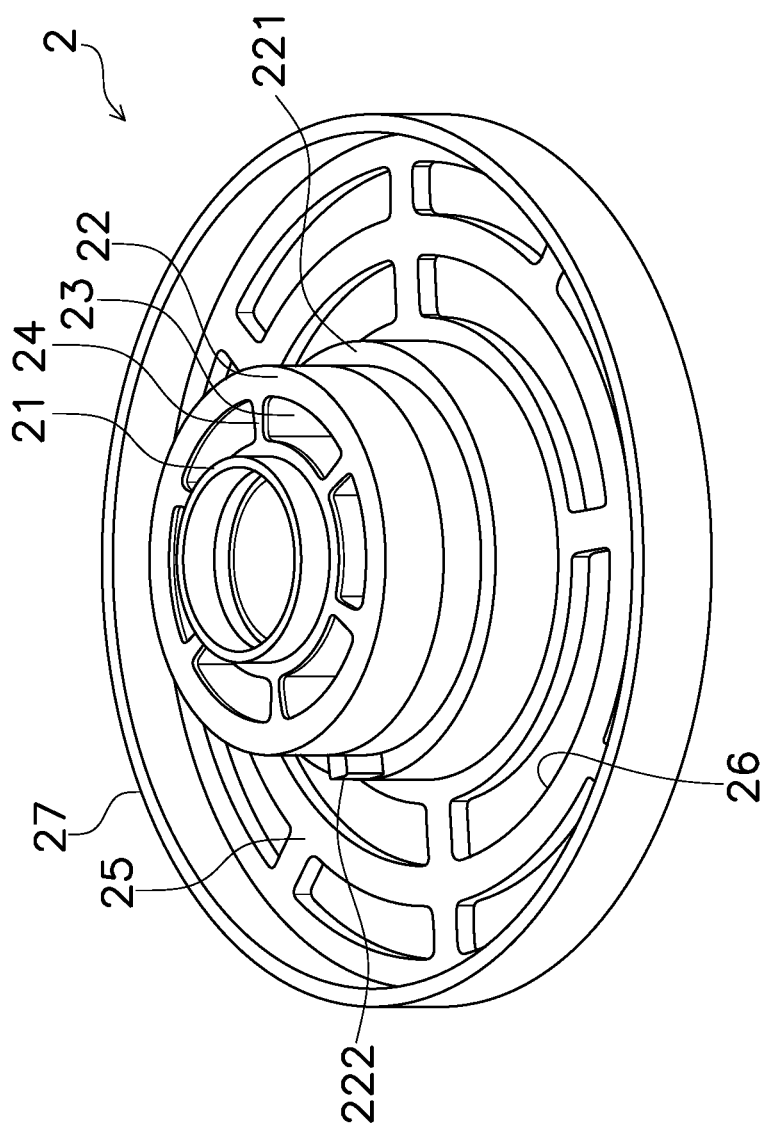
FIG. 3 is a perspective view of a support frame.

As shown in FIG. 3, the second tubular part 22 includes a stepped portion 221 on the outer peripheral surface thereof. The stepped portion 221 is formed by increase in outer diameter of the second tubular part 22 at the axially second end thereof. The stepped portion 221 restricts the stator 3 from moving to the lower side.

The second tubular part 22 includes an engaging protrusion 222 on the outer peripheral surface thereof. The engaging protrusion 222 protrudes radially outward from the outer peripheral surface of the second tubular part 22.

Figure 4:
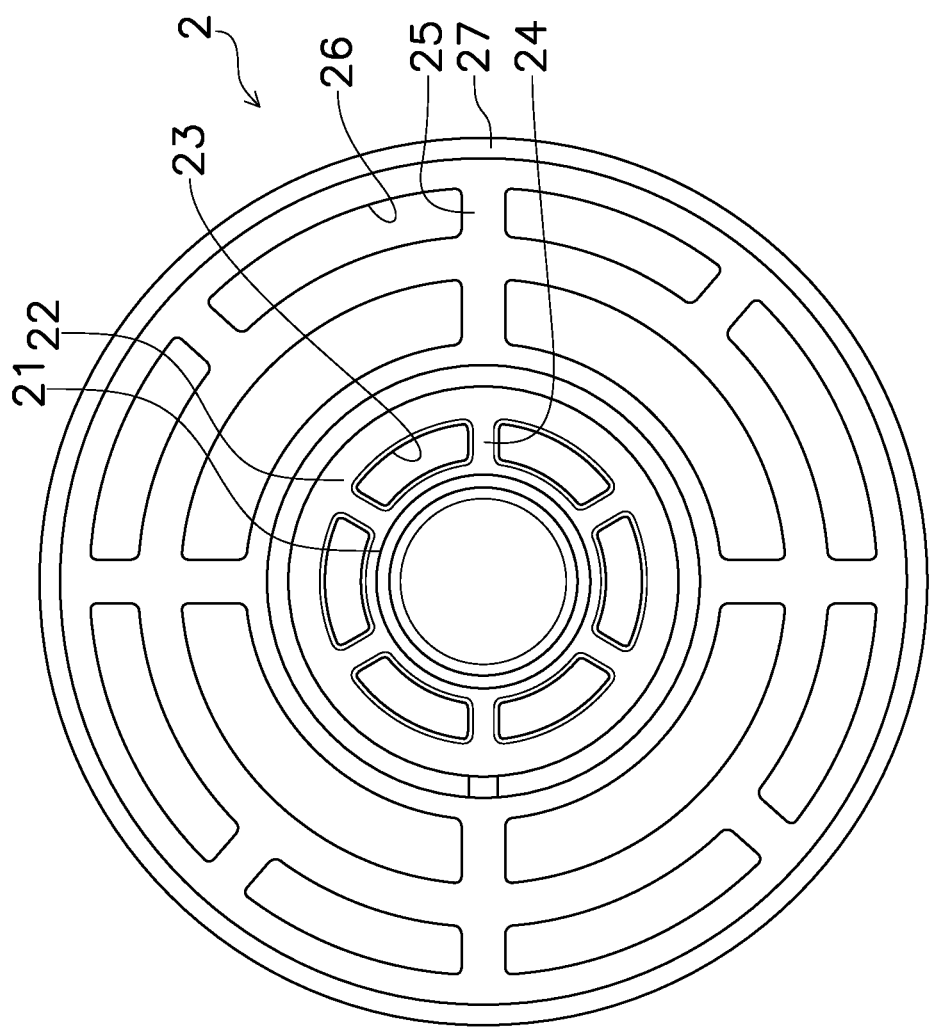
FIG. 4 is a plan view of the support frame.

As shown in FIGS. 3 and 4, the first and second tubular parts 21 and 22 are coupled through a plurality of coupling parts 24. Each coupling part 24 extends in the radial direction. Besides, each coupling part 24 extends in the axial direction. In other words, each coupling part 24 is made in the shape of a plate. The coupling parts 24 are disposed apart from each other at intervals in the circumferential direction.

The vent holes 23 are provided between the first and second tubular parts 21 and 22 so as to extend in the axial direction. Each vent hole 23 is an axially penetrating hole.

Each vent hole 23 is defined by the first tubular part 21, the second tubular part 22, and each pair of coupling parts 24.

As seen in the axial view, each vent hole 23 extends in the circumferential direction. The vent holes 23 are arranged in the circumferential direction. In other words, the plural vent holes 23 form an annular shape.

Each vent hole 23 is configured to have a cross-sectional area gradually increasing to the upper side at the upper end thereof (see FIG. 2).

The support frame 2 further includes a first disc part 25 and an outer wall part 27. The first disc part 25 is fixed to the lower end of the second tubular part 22. The second tubular part 22 extends from the middle of the first disc part 25 to the upper side. The first disc part 25 is provided with a plurality of slit holes 26. Each slit hole 26 extends in the circumferential direction.

The outer wall part 27 extends from the outer peripheral end of the first disc part 25 to the upper side. The outer wall part 27 is less in axial length than each of the first and second tubular parts 21 and 22.

[Stator]

As shown in FIG. 2, the stator 3 is supported by the support frame 2. When described in detail, the stator 3 is supported by the second tubular part 22 of the support frame 2. The stator 3 is disposed radially outside the second tubular part 22. In other words, the second tubular part 22 is disposed inside a through hole provided in the middle of the stator 3.

Figure 5:
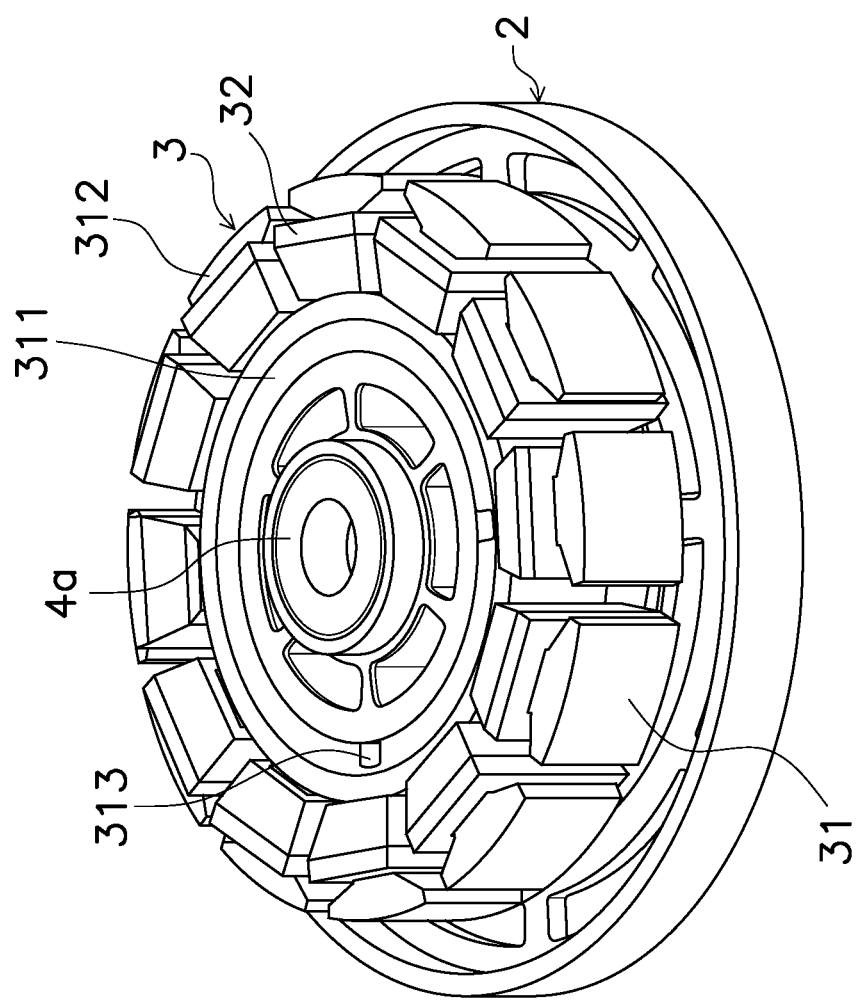
FIG. 5 is a perspective view of the motor that a rotor is detached.

As shown in FIG. 5, the stator 3 includes a stator core 31 and a plurality of coil parts 32. The stator core 31 is formed by laminating a plurality of electromagnetic steel plates. The stator core 31 includes a yoke 311 and a plurality of teeth 312.

The yoke 311 has an annular shape. The second tubular part 22 is disposed inside the opening of the yoke 311. The yoke 311 is provided with an engaging recess 313 on the inner peripheral surface thereof. The engaging protrusion 222 of the second tubular part 22 is engaged with the engaging recess 313, whereby the stator 3 is restricted from rotating.

The teeth 312 extend radially outward from the yoke 311. The teeth 312 are disposed apart from each other at intervals in the circumferential direction.

The coil parts 32 are wound about the stator core 31. When described in detail, the coil parts 32 are wound about the teeth 312, respectively. It should be noted that an insulating layer is interposed between the coil parts 32 and the teeth 312. Besides, the insulating later is interposed between the coil parts 32 and the yoke 311 as well. For example, the insulating layer covers not only the teeth 312 but also the outer peripheral part of the yoke 311.

As shown in FIG. 2, the coil parts 32 further extend than the second tubular part 22 to the upper side. In other words, the upper end of each coil part 32 is located on the upper side in comparison with that of the second tubular part 22. Besides, the upper end of each coil part 32 extends radially inside to slant down. According to this configuration, the air can be led to the vent holes 23.

[Bearing Members]

The motor 100 according to the present preferred embodiment includes two bearing members 4a and 4b. It should be noted that the bearing member disposed on the upper side will be referred to as "first bearing member 4a", whereas that disposed on the lower side (exemplary second side in the axial direction) will be referred to as "second bearing member 4b".

The first and second bearing members 4a and 4b are disposed inside the first tubular part 21. Besides, the first and second bearing members 4a and 4b are supported by the first tubular part 21. The first and second bearing members 4a and 4b are fitted into the first tubular part 21. The first and second bearing members 4a and 4b are disposed apart from each other at an interval in the axial direction.

The first bearing member 4a is supported inside the protruding portion 212. When described in detail, the first bearing member 4a is supported by both the body 211 and the protruding portion 212 of the first tubular part 21. The first bearing member 4a is restricted from moving to the upper side by the rotor 5. Besides, the first bearing member 4a is restricted from moving to the lower side by one of the stepped portions provided inside the first tubular part 21.

The second bearing member 4b is supported by only the body 211 of the first tubular part 21. The second bearing member 4b is restricted from moving to the upper side by another of the stepped portions provided inside the first tubular part 21. Besides, the second bearing member 4b is urged to the upper side by an elastic member 56 to be described.

[Rotor]

The rotor 5 is configured to rotate the propeller. The rotor 5 includes a rotor frame 51, a shaft 52, and a permanent magnet 53. The rotor 5 is attached to the support frame 2 in a rotatable manner. Specifically, the rotor 5 is attached to the support frame 2 through the first and second bearing members 4a and 4b.

The rotor frame 51 is disposed to the upper side of the support frame 2. The rotor frame 51 is disposed to cover the stator 3. The rotor frame 51 includes a second disc part 511 and a second outer wall part 512.

The second disc part 511 includes a slant portion 511a extending radially outward to slant down. The slant portion 511a has an annular shape and extends in the circumferential direction. The slant portion 511a is disposed to the upper side of the coil parts 32.

The second disc part 511 includes a plurality of through holes 513. The through holes 513 are provided in an outer peripheral end of the second disc part 511. When described in detail, the through holes 513 are provided in the slant portion 511a. The through holes 513 are disposed radially outside the vent holes 23. Besides, the through holes 513 are in part disposed radially outside the coil parts 32. In other words, the through holes 513, the coil parts 32, and the vent holes 23 are sequentially disposed in this order from radially outside. According to this configuration, the air is enabled to smoothly flow from the through holes 513 to the vent holes 23.

As shown in FIG. 1, the plural through holes 513 are arranged in the circumferential direction. When seen in the axial direction, each through hole 513 is an elongated hole extending in the circumferential direction. As seen in the axial view, the coil parts 32 are exposed through the through holes 513.

As shown in FIG. 2, the shaft 52 is fixed to the rotor frame 51. In other words, the shaft 52 is unitarily rotated with the rotor frame 51. The shaft 52 extends from the rotor frame 51 to the lower side. The shaft 52 is attached in a rotatable manner to the support frame 2 through the first and second bearing members 4a and 4b. When described in detail, the shaft 52 is fixed to inner races of the first and second bearing members 4a and 4b.

The shaft 52 has a cylindrical shape. The shaft 52 is provided with a threaded hole 521 in the lower end thereof. The threaded hole 521 is opened to the lower side.

The permanent magnet 53 is attached to the second outer wall part 512 of the rotor frame 51. When described in detail, the permanent magnet 53 is attached to the inner peripheral surface of the second outer wall part 512. The permanent magnet 53 is disposed radially outside the stator 3. In other words, the permanent magnet 53 is disposed to enclose the stator 3.

The rotor 5 further includes a boss part 54. The boss part 54 extends from the middle of the rotor frame 51 to the upper side. The boss part 54 has a cylindrical shape. The propeller is attached to the boss part 54.

Besides, the rotor 5 further includes a washer 55, the elastic member 56, and a pressing member 57. The washer 55, the elastic member 56, and the pressing member 57 are disposed in the lower end inside the first tubular part 21.

The washer 55 is attached to the shaft 52 through a bolt 58. The bolt 58 is screwed into the threaded hole 521 of the shaft 52. The elastic member 56 and the pressing member 57 are disposed between the washer 55 and the second bearing member 4b. The elastic member 56 is disposed between the washer 55 and the pressing member 57. The elastic member 56 is, for instance, a disc spring. The elastic member 56 urges the pressing member 57 to the upper side. The pressing member 57 presses the inner race of the second bearing member 4b to the upper side. When described in detail, the pressing member 57 includes a pressing protrusion 571 having an annular shape. The pressing protrusion 571 presses the inner race of the second bearing member 4b.

MODIFICATIONS

One preferred embodiment of the present invention has been explained above. However, the present invention is not limited to the above, and a variety of changes can be made without departing from the gist of the present invention.

Modification 1

In the preferred embodiment described above, as seen in the axial view, each vent hole 23 is extended in the circumferential direction. However, the shape of each vent hole 23 is not limited to this. For example, as seen in the axial view, each vent hole 23 can have a circular shape, a rectangular shape, or any other shape.

Modification 2

In the preferred embodiment described above, the motor 100 includes two bearing members by which the rotor is supported in a rotatable manner. However, the number of bearing members is not limited to two. In other words, the motor 100 can include only one bearing member, or alternatively, can include three or more bearing members.

REFERENCE SIGNS LIST

100 Motor
2 Support frame
21 First tubular part
211 Body
212 Protruding portion
22 Second tubular part
23 Vent hole
3 Stator
31 Stator core
32 Coil part
4a First bearing member 4*b* Second bearing member
5 Rotor
51 Rotor frame
52 Shaft
53 Permanent magnet
54 Boss part

What is claimed is:

1. A motor comprising:
   a support frame including a first tubular part, a second tubular part, a plurality of coupling parts, and a plurality of vent holes, the second tubular part disposed radially outside the first tubular part, the plurality of coupling parts disposed at intervals in a circumferential direction, each of the plurality of vent holes defined by the first tubular part and the second tubular part so as to extend in an axial direction, the plurality of vent holes separated by the plurality of coupling parts;
   a stator disposed radially outside the second tubular part, the stator supported by the second tubular part;
   a bearing member disposed inside and supported by the first tubular part; and
   a rotor including a rotor frame, a shaft, and a permanent magnet, the rotor frame disposed on a first side with respect to the support frame in the axial direction, the shaft fixed to the rotor frame, the shaft attached in a rotatable manner to the support frame through the bearing member, the permanent magnet disposed radially outside the stator, the permanent magnet supported by the rotor frame.

2. The motor according to claim 1, wherein the first tubular part includes a protruding portion protruding further than the second tubular part to the first side in the axial direction.

3. The motor according to claim 2, wherein
   the first tubular part includes a body, and
   the protruding portion protrudes from the body to the first side in the axial direction, the protruding portion less in outer diameter than the body.

4. The motor according to claim 2, wherein the bearing member is supported inside the protruding portion.

5. The motor according to claim 1, wherein
   the rotor frame includes a plurality of through holes arranged in the circumferential direction, and
   the plurality of through holes are disposed radially outside the plurality of vent holes.

6. The motor according to claim 5, wherein
   the rotor frame includes a slant portion extending radially outward to approach a second side in the axial direction, and
   the plurality of through holes are provided in the slant portion.

7. The motor according to claim 1, wherein each of the plurality of vent holes has a cross-sectional area gradually increasing to the first side in the axial direction at an end thereof disposed on the first side in the axial direction.

8. The motor according to claim 1, wherein
   the rotor includes a boss part protruding from the rotor frame to the first side in the axial direction, and
   the boss part is configured to allow a propeller to be attached thereto.

9. The motor according to claim 1, wherein the stator includes a stator core and a coil part wound about the stator core.

10. The motor according to claim 9, wherein the coil part further extends than the second tubular part to the first side in the axial direction.

* * * * *